(12) United States Patent
Li

(10) Patent No.: US 8,128,054 B2
(45) Date of Patent: Mar. 6, 2012

(54) SUPPORT MECHANISM AND PORTABLE ELECTRONIC DEVICE USING THE SAME

(75) Inventor: Jun Li, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 255 days.

(21) Appl. No.: 12/578,177

(22) Filed: Oct. 13, 2009

(65) Prior Publication Data
US 2010/0276553 A1 Nov. 4, 2010

(30) Foreign Application Priority Data
Apr. 30, 2009 (CN) .......................... 2009 1 0302046

(51) Int. Cl.
*A47G 29/00* (2006.01)
*F16M 11/00* (2006.01)

(52) U.S. Cl. ..................... 248/685; 248/163.1; 248/371; 248/682

(58) Field of Classification Search .................. 248/685, 248/688, 454, 371, 398, 126; 361/679.59, 361/679.56, 679.02, 679.05, 679.55
See application file for complete search history.

(56) References Cited

U.S. PATENT DOCUMENTS

| | | | | |
|---|---|---|---|---|
| 3,924,775 A * | 12/1975 | Andreaggi et al. | | 220/756 |
| 5,082,230 A * | 1/1992 | Chang | | 248/476 |
| 5,396,399 A * | 3/1995 | Blair et al. | | 361/679.26 |
| 5,823,504 A * | 10/1998 | Kuwajima | | 248/685 |
| 6,284,407 B1 * | 9/2001 | Murray et al. | | 429/186 |
| 7,001,088 B2 * | 2/2006 | Hui-hu | | 400/681 |
| 7,104,516 B2 * | 9/2006 | Uto et al. | | 248/688 |
| 7,249,739 B2 * | 7/2007 | Chueh et al. | | 248/133 |
| 7,342,779 B2 * | 3/2008 | Knight | | 361/679.55 |
| 7,415,108 B2 * | 8/2008 | Toh | | 379/445 |
| 7,950,617 B2 * | 5/2011 | Zhu et al. | | 248/469 |
| 8,023,283 B2 * | 9/2011 | Cheng et al. | | 361/801 |
| 2006/0082957 A1 * | 4/2006 | Chen | | 361/681 |
| 2007/0217135 A1 * | 9/2007 | Chuang et al. | | 361/681 |

* cited by examiner

*Primary Examiner* — Amy J Sterling
(74) *Attorney, Agent, or Firm* — Altis Law Group, Inc.

(57) ABSTRACT

A support mechanism for a portable electronic device comprises two legs and a support bracket. The legs are retractably received in the portable electronic device. When the legs are withdrawn from the portable electronic device, the contact shoulder provides linear contact of the portable electronic device on a surface.

19 Claims, 6 Drawing Sheets

SUPPORT MECHANISM AND PORTABLE ELECTRONIC DEVICE USING THE SAME

BACKGROUND

1. Technical Field

The exemplary disclosure generally relates to support mechanisms, particularly to support mechanisms used with portable electronic devices.

2. Description of Related Art

Portable electronic devices with displays, especially portable Audio/Video products are widely used. Considering consumers' requirements for multiple-angle displays, some portable electronic devices have support brackets fixed to them. The portable electronic device can stand alone on a surface, supported by the bracket. Thus, multiple viewers have a sight line to the display.

Commonly used support mechanisms include separate support mechanisms independent from the device and collapsible/deployable support mechanisms integrally mounted on the device. However, the separate support mechanism it inconvenient to transport and set up. The collapsible/deployable support mechanism provides only a single point of support for the device on a plane surface. The portable electronic device cannot be firmly and dependably supported thereby.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the exemplary support mechanism and portable electronic device using the support mechanism. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
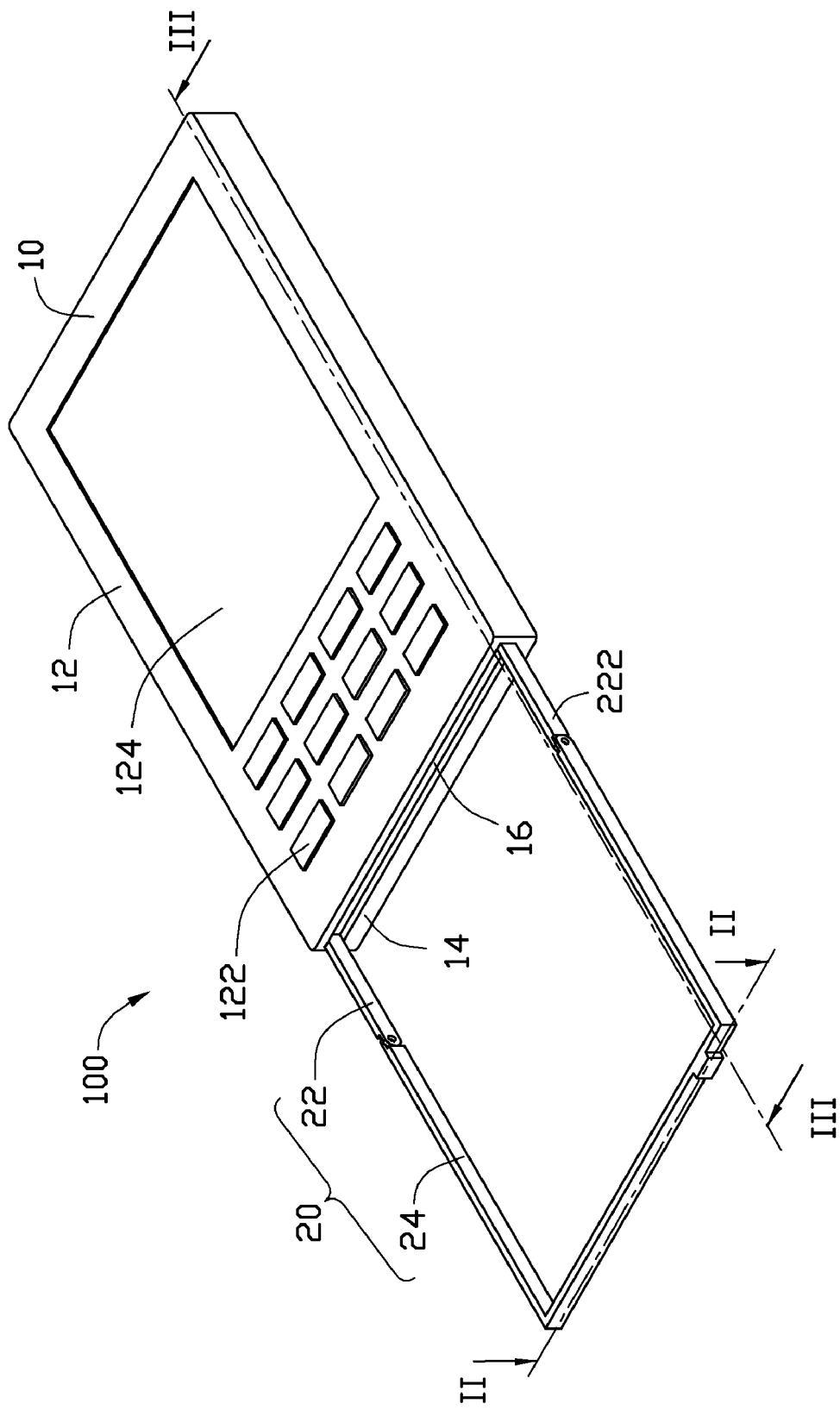
FIG. 1 is an assembled, isometric view of exemplary embodiment of a support mechanism utilized in a portable electronic device, the support mechanism shown in a deployed position.
Figure 6:
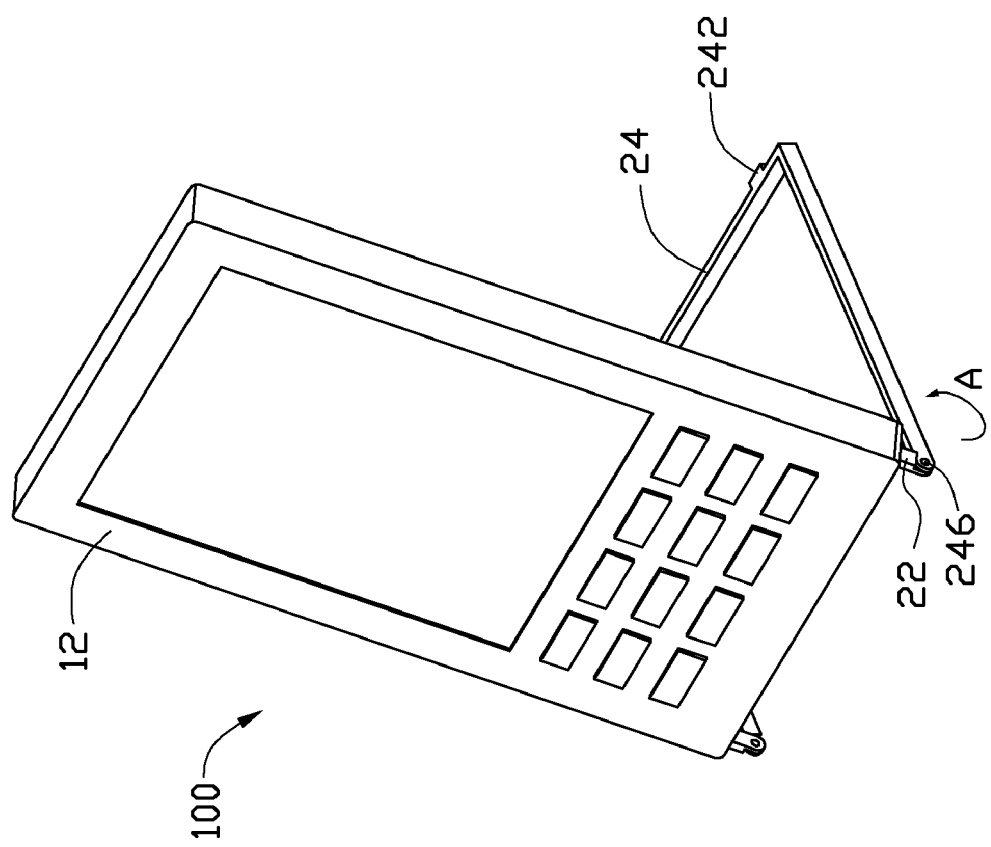
FIG. 6 is an isometric view of the portable electronic device of FIG. 2 with a contact shoulder rotated about two legs.

FIG. 1 is an assembled, isometric view of exemplary embodiment of a support mechanism 20, utilized in a portable electronic device 100. FIG. 1 shows a front view of the device 100 including a body member 10. In FIG. 1, the support mechanism 20 is deployed and ready to adjust. As is described and illustrated herein, the support mechanism 20 may also be pivotally adjusted to a deployed position to support the device 100 on a surface (As shown in FIG. 6).

Figure 2:
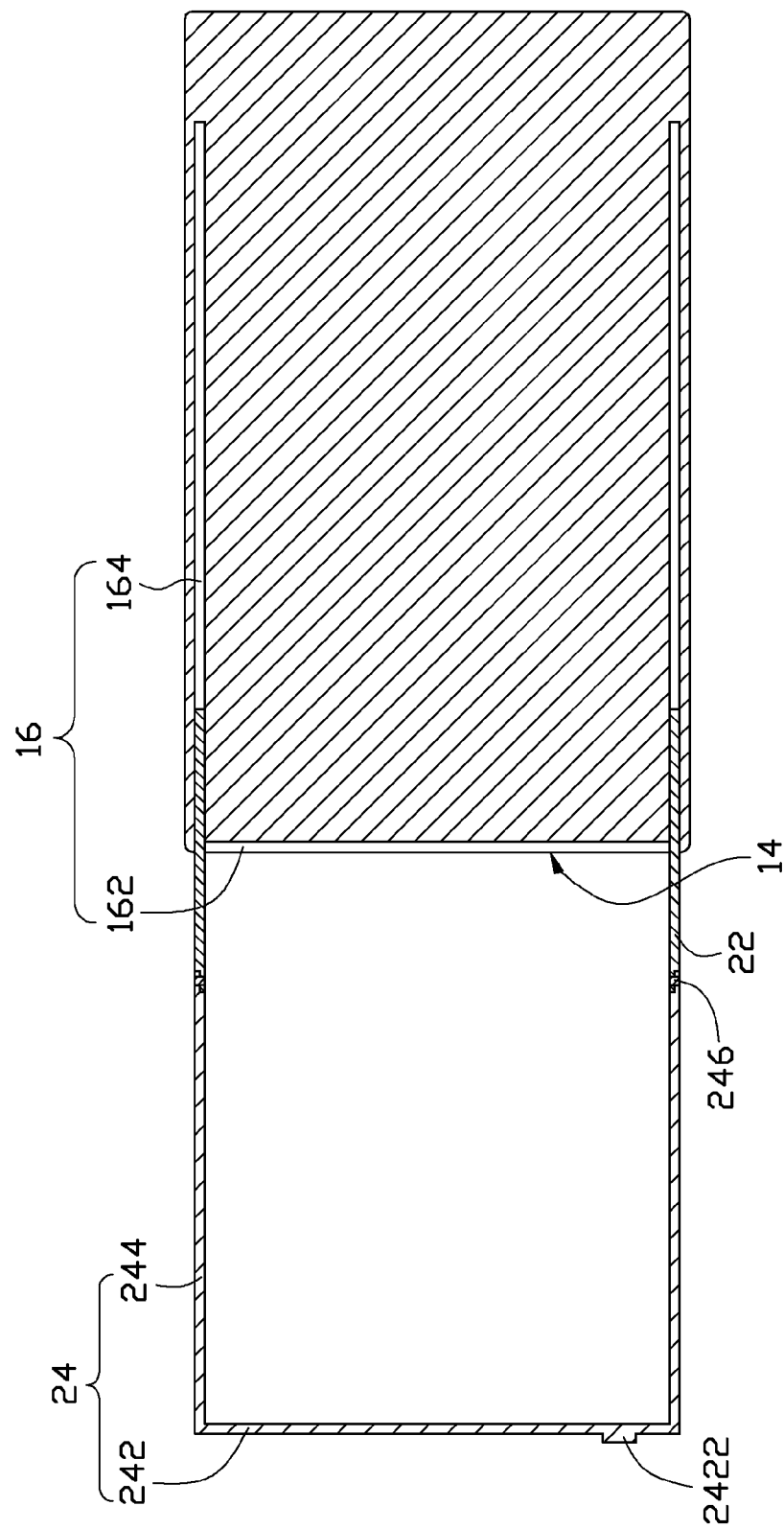
FIG. 2 is a cross-section of a portable electronic device utilizing a support mechanism, along a line of II-II shown in FIG. 1.

The body member 10 includes a front surface 12, on which a plurality of keys 122 and a display 124 are disposed. Referring to FIG. 2, the body member 10 further includes an end surface 14 connecting perpendicular to the front surface 12, in which a U-shaped receiving portion 16 is defined. The receiving portion 16 corresponds in size to and accommodates the support mechanism 20. When the support mechanism 20 is stowed, the support mechanism 20 is received in the receiving portion 16. In this exemplary embodiment, the receiving portion 16 includes a recess 162 defined along the end surface 14 and two spaced sliding grooves 164 defined in a bottom surface of the recess 162.

Figure 3:
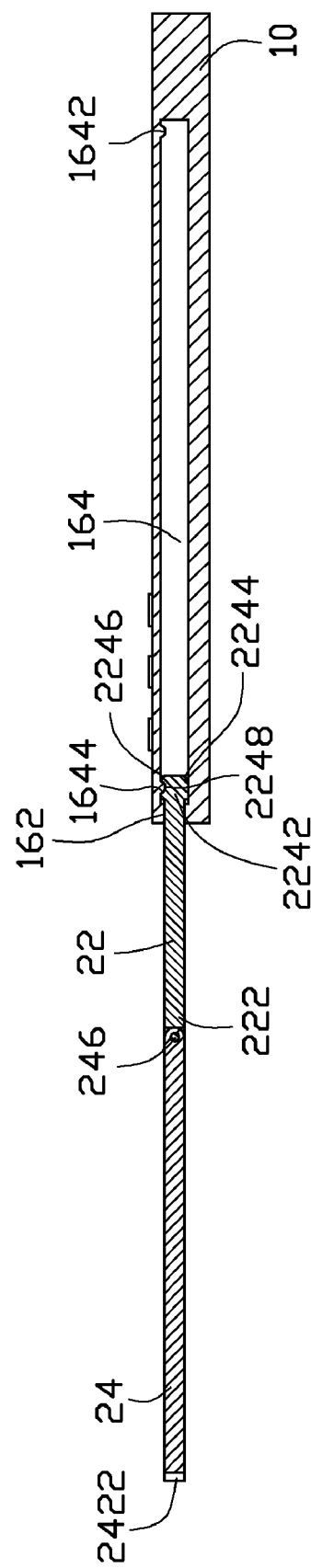
FIG. 3 is a cross-section of the portable electronic device of FIG. 2, along the line of III-III shown in FIG. 1.

Referring to FIG. 3, each sliding groove 164 has a first latching portion 1642 and a second latching portion 1644 spaced and protruding from an inner surface thereof. The first latching portion 1642 is located adjacent to one end of the sliding grooves 164 away from the recess 162, to firmly secure the support mechanism 20 in the receiving portion 16 when the support mechanism 20 is in the stowed position (see FIG. 5). The second latching portion 1644 is located adjacent to another end of the sliding grooves 164 communicating with the recess 162, to firmly secure the support mechanism 20 in the receiving portion 16 when the support mechanism 20 is in the deployed position (see FIG. 3).

Referring to FIGS. 2 and 3, the support mechanism 20 includes two legs 22 and a support bracket 24. A first end 222 of each leg 22 is pivotally coupled to the support bracket 24 by a high-friction rotating mechanism such as shafts or hinges 246. A second end 224 of each leg 22, opposite to the first end 222, has a sliding portion 2242 protruding outwardly therefrom. Each sliding portion 2242 terminates at a distal end with a pair of radial inward-sloping planes 2244, 2246, such that the sliding portions 2242 are easily inserted into the sliding grooves 164 from the recess 162. Each sliding portion 2242 further has a slot 2248 defined therein and configured to latch with the first latching portions 1642, such that the support mechanism 20 can be firmly maintained in the stowed position (see FIG. 5), and configured to latch with the second latching portions 1644 such that the support mechanism 20 can be firmly maintained in its deployed position (see FIG. 3).

The support bracket 24 is substantially U-shaped and has a contact shoulder 242 and two connecting shoulders 244, an end of each connecting shoulder 244 pivotally coupled with one leg 22, and another end of each fixed with the contact shoulder 242. The contact shoulder 242 has a finger grip 2422 protruding outwardly therefrom for facilitating withdrawal of the support mechanism 20 from the receiving portion 16 of the body member 10.

Figure 4:
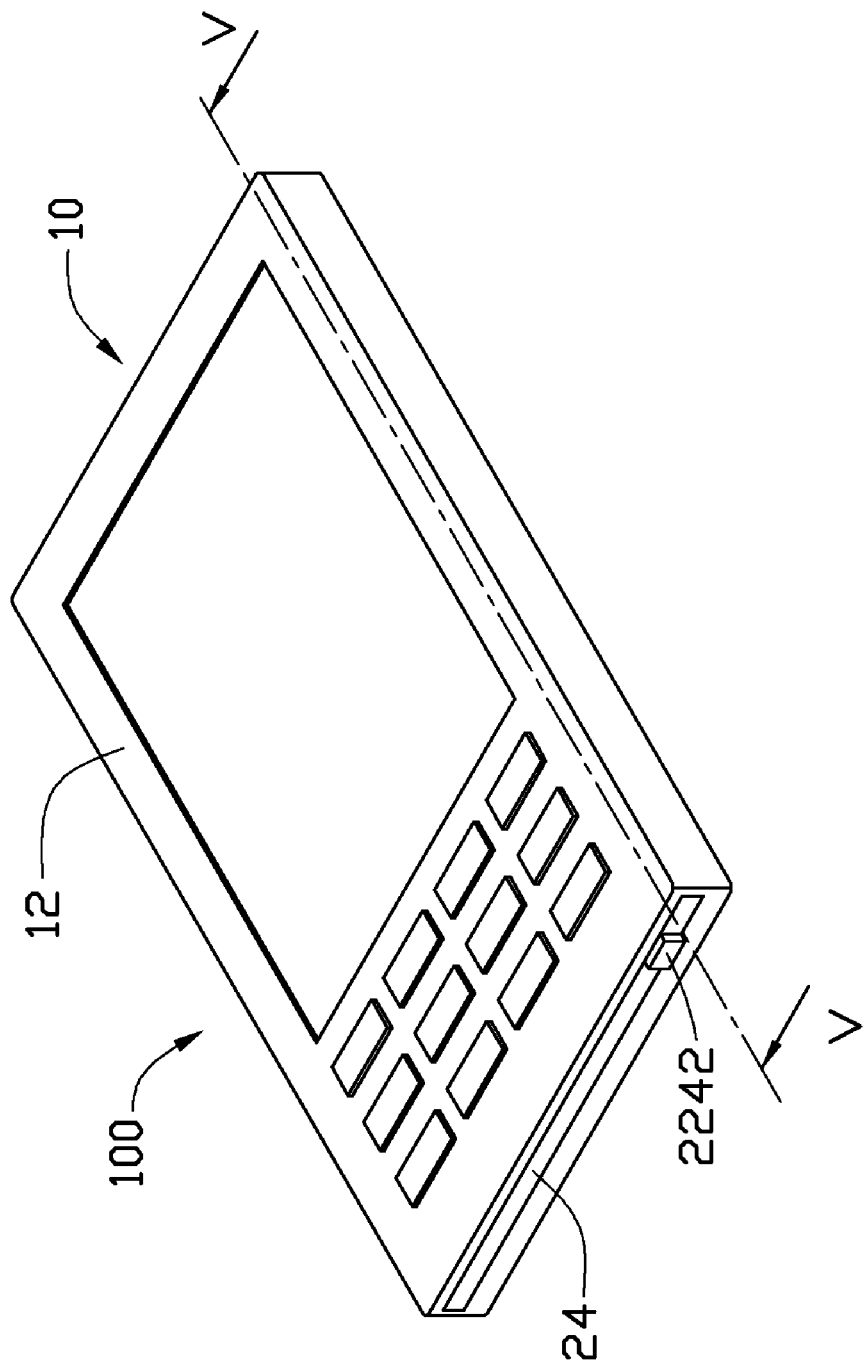
FIG. 4 is an assembled, isometric view of the support mechanism of FIG. 1, shown in a stowed position.
Figure 5:
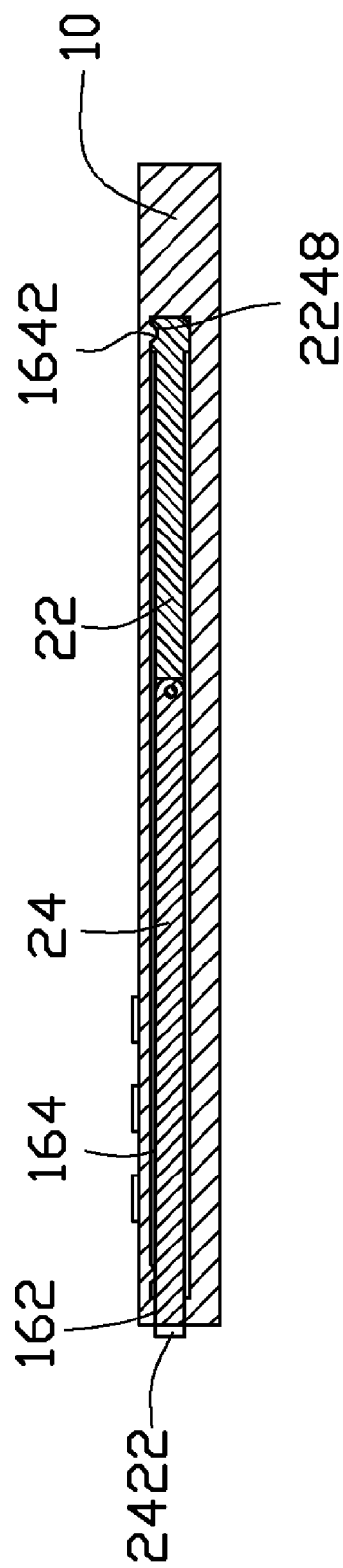
FIG. 5 is a cross-section of the portable electronic device of FIG. 2, along the line of V-V shown in FIG. 1.

Referring to FIGS. 4 and 5, the finger grip 2422 is pulled to slide the sliding portions 2242 in the sliding grooves 164, withdrawing the first latching portions 1642 from the slots 2248 of the sliding portions 2242. Referring to FIG. 6, the finger grip 2422 is continuously pulled until the second latching portions 1644 latch the slots 2248, so that the supporting mechanism 20 is completely and firmly deployed. The support bracket 24 is then rotated about the legs 22 in the direction indicated by the arrow A. As the support bracket 24 is rotated in this manner, the support mechanism 20 provides support of the body member 10 on a surface. The support bracket 24 of the support mechanism 20 provides linear contact of the portable electronic device with a surface, providing stable support for the device 100 on a surface. Additionally, the angle between the legs 22 and the support bracket 24 can be regulated by rotating the legs 22 and the support bracket 24 as needed. The high-friction rotating mechanism assures that the angle between the legs 22 and the support bracket 24 can be maintained at any value.

It is to be understood, however, that even though numerous characteristics and advantages of the embodiments have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A support mechanism used for a portable electronic device comprising:
   two legs slidably received in the portable electronic device; and
   a support bracket comprising a contact shoulder and two connecting shoulders, one end of each connecting shoulder pivotally coupled with a corresponding leg, and another end of each connecting shoulder fixed to the contact shoulder;
   wherein when the legs are receivable in the portable electronic device, the support bracket is received in the portable electronic device, and when the legs are withdrawn from the portable electronic device, the contact shoulder provides linear contact for the portable electronic device on a surface.

2. The support mechanism as claimed in claim 1, wherein a first end of each leg is pivotally coupled to one corresponding connecting shoulder by a rotating mechanism.

3. The support mechanism as claimed in claim 2, wherein a second end of each leg, opposite to the first end, comprises a sliding portion protruding outwardly therefrom, the sliding portions are slidably mounted in the portable electronic device.

4. The support mechanism as claimed in claim 3, wherein each sliding portion terminates at a distal end with a pair of radial inward-sloping planes.

5. The support mechanism as claimed in claim 3, wherein each sliding portion further comprises a slot defined therein and configured to latch the portable electronic device.

6. The support mechanism as claimed in claim 3, wherein the contact shoulder comprises a finger grip protruding outwardly therefrom for facilitating removing the support mechanism from the portable electronic device.

7. A portable electronic device comprising:
   a body member; and
   a support mechanism comprising:
   two legs slidably receivable in the body member; and
   a support bracket comprising a contact shoulder and two connecting shoulders, an end of each connecting shoulder pivotally coupled with a corresponding leg, and another end of each connecting shoulder fixed to the contact shoulder;
   wherein when the legs are received in the body member, the support bracket is received in the body member, and when the legs are withdrawn from the portable electronic device, the contact shoulder provides linear contact of the body member on a surface.

8. The portable electronic device as claimed in claim 7, wherein a first end of each leg is pivotally coupled to one corresponding connecting shoulder by a rotating mechanism.

9. The portable electronic device as claimed in claim 8, wherein a second end of each leg, opposite to the first end, comprises a sliding portion protruding outwardly therefrom, the sliding portions are slidably mounted in the body member.

10. The portable electronic device as claimed in claim 9, wherein the contact shoulder comprises a finger grip protruding outwardly therefrom for facilitating pulling the support mechanism out of the body member.

11. The portable electronic device as claimed in claim 9, wherein each sliding portion terminates at a distal end with a pair of radial inward-sloping planes.

12. The portable electronic device as claimed in claim 9, wherein each sliding portion further comprises a slot defined therein and configured to latch with the body member.

13. The portable electronic device as claimed in claim 12, wherein the body member comprises a front surface on which a display is mounted.

14. The portable electronic device as claimed in claim 13, wherein the body member further comprises an end surface connecting to the front surface in which a receiving portion is defined, the support mechanism being retained in the receiving portion.

15. The portable electronic device as claimed in claim 14, wherein the receiving portion comprises a recess defined in the end surface and two spaced sliding grooves defined in a bottom surface of the recess, wherein the contact shoulder is received in the recess and the connecting shoulders and the legs are received in the sliding grooves.

16. The portable electronic device as claimed in claim 15, wherein each sliding groove has a first latching portion and a second latching portion spaced and protruding from an inner surface thereof, the first latching portion and the second latching portion are latched with the slot in turn.

17. A portable electronic device, comprising:
    a body member, the body member having a receiving portion defined therein; and
    a support mechanism, the supporting mechanism being slidably received in the receiving portion of the body member, the support mechanism comprising:
    a first member slidably mounted to the body member; and
    a support bracket providing linear contact of the body member on a surface, one end of the support bracket pivotally coupled with the first member, and the first member having at least two pivoting connecting points pivotally coupled with the support bracket;
    wherein when the support bracket is withdrawn from receiving portion, the first member is capable of rotating about the support bracket and supported by the support bracket; the first member comprises two legs; the support bracket comprises a contact shoulder and two spaced connecting shoulders connected by the contact shoulder, wherein an end of each connecting shoulder is pivotally coupled with one corresponding leg, and another end of each connecting shoulder fixed to the contact shoulder, with the contact shoulder providing linear contact of the body member on a surface.

18. The portable electronic device as claimed in claim 17, wherein a first end of each leg is pivotally coupled to one corresponding connecting shoulder by a rotating mechanism.

19. The portable electronic device as claimed in claim 18, wherein a second end of each leg, opposite to the first end, comprises a sliding portion protruding outwardly therefrom, the sliding portions slidably mounted in the body member.

* * * * *